3,106,576
N-(2-PHENYLCYCLOPROPYL)CARBAMATES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed Oct. 17, 1960, Ser. No. 62,859
5 Claims. (Cl. 260—471)

This invention relates to novel N-(2-phenylcyclopropyl)carbamate and -formamide derivatives having valuable therapeutic activity. These compounds are useful as antidepressant agents having potent monoamine oxidase inhibiting activity together with a low order of toxicity.

The novel compounds of this invention are represented by the following structural formula:

Formula I $$R_1-CH\underset{CH_2}{\overset{}{\diagdown\diagup}}CH-N(R_3)-\underset{O}{\overset{\|}{C}}-R_2$$

when:

$R_1$ represents phenyl, chlorophenyl, fluorophenyl, trifluoromethylphenyl, lower alkylphenyl, dichlorophenyl or di-lower alkylphenyl;

$R_2$ represents hydrogen, lower alkoxy, aralkoxy having 7 to 8 carbon atoms such as benzyloxy or phenethoxy; and $R_3$ represents hydrogen or lower alkyl.

Advantageous compounds of this invention which are particularly potent tryptamine potentiating agents are represented by the following formula:

Formula II $$R_4-\bigcirc-CH\underset{CH_2}{\overset{}{\diagdown\diagup}}CH-N(R_3)-\underset{O}{\overset{\|}{C}}-O-A-\bigcirc$$

when:

A represents an alkylene group having 1–2 carbon atoms;

$R_3$ represents hydrogen or methyl; and $R_4$ represents hydrogen, chloro or trifluoromethyl.

A particularly advantageous and preferred compound is benzyl N-(2-phenylcyclopropyl)carbamate.

For example in a standard test for monoamine oxidase inhibition, namely tryptamine potentiation in rats, the $ED_{50}$ of benzyl N-(2-phenylcyclopropyl)carbamate is 0.13 mg./kg. while the $ED_{50}$ of the corresponding ethyl carbamate is 1.95 mg./kg. Thus while both compounds have very useful activity the benzyl carbamate is about 15 times as active as the corresponding ethyl ester. Untoward side effects were not observed in the tests with either compound.

By the terms "lower alkyl" and "lower alkoxy" where used herein alone or in combination with other terms, groups having from 1–4, preferably 1–2, carbon atoms are indicated.

The compounds of this invention may be present as cis-trans isomers due to the geometrical arrangement of the phenyl and the amino moieties with respect to the cyclopropane ring and further as $d,l$ optical isomers. It is intended to include in this invention all of these isomers, the separated cis and trans isomers and the resolved $d$- or $l$-isomers as well as the mixtures of these isomers. At present the trans isomers appear to possess particularly advantageous antidepressant and ataractic activity and are therefore preferred.

The phenylcyclopropylcarbamic acid esters of this invention are prepared by reacting the known 2-phenylcyclopropylamine with at least an equivalent amount of the appropriate ester of chloroformic acid. The reaction is carried out in the presence of an aqueous solution of an acid binding agent such as an alkali metal hydroxide for example sodium or potassium hydroxide, keeping the reaction temperature below about 20° C. The phenylcyclopropylcarbamate product is isolated by extracting the reaction mixture with a water immiscible organic solvent such as ether or benzene, drying and concentrating the extracts and distilling the residue.

The phenylcyclopropylformamide compounds of this invention are prepared by reacting the 2-phenylcyclopropylamine with an excess of ethyl formate at elevated temperature preferably at the reflux temperature of the mixture. Removal of the excess ethyl formate and purification of the residue by recrystallization from a suitable solvent such as petroleum ether or hexane gives the desired formamide.

Alternatively, the carbamates of this invention are prepared from the appropriately substituted styrenes as follows:

$$R_1-CH=CH_2 + N_2CHCOOC_2H_5 \longrightarrow R_1-CH\underset{CH_2}{\overset{}{\diagdown\diagup}}CH-COOC_2H_5$$

$$\downarrow$$

$$R_1-CH\underset{CH_2}{\overset{}{\diagdown\diagup}}CH-CON_3 \longleftarrow R_1-CH\underset{CH_2}{\overset{}{\diagdown\diagup}}CH-COOH$$

$$\downarrow$$

$$R_1-CH\underset{CH_2}{\overset{}{\diagdown\diagup}}CH-N=C=O \longrightarrow R_1-CH\underset{CH_2}{\overset{}{\diagdown\diagup}}CH-\underset{O}{\overset{\|}{CHNHC}}R_2$$

The styrene is condensed with ethyl diazoacetate to give an ethyl 2-phenylcycopropanecarboxylate which can be fractionally distilled to separate the cis and trans isomeric carboxylates. The carboxylates are saponified by refluxing with an aqueous alcoholic solution of an alkali metal hydroxide such as potassium or sodium hydroxide to give the corresponding carboxylic acids. Alternatively, the isomeric mixture of carboxylates can be saponified as above to give a mixture of carboxylic acids which can be then separated into the cis and trans isomers by fractional crystallization.

An advantageous method for the stereospecific conversion of phenylcyclopropane carboxylic acids to the corresponding carbamates is to react the carboxylic acid with a lower alkyl haloformate to give the corresponding cyclopropyl mixed anhydride. The reaction is preferably carried out in the present of an organic base preferably a tertiary amine such as triethylamine at about 0–20° C. in a mixture of water and a water miscible organic solvent such as dioxane or acetone. The mixed anhydride thus formed is treated with sodium azide to give the corresponding cyclopropyl acid azide. The azide is heated in an inert organic solvent such as toluene or xylene to give, upon removal of the solvent, the corresponding isocyanate. The isocyanate is then heated with the appropriate alcohol at about 80–125° C. for about 30–120 minutes to give the desired carbamate of this invention.

Alternatively the cyclopropylcarboxylic acid is converted to the corresponding azide by treating with a chlorinating agent such as thionyl chloride or phosphorus pentachloride and treating the acid chloride with sodium azide. Another procedure to accomplish the same conversion is to esterify the cyclopropylcarboxylic acid with diazomethane in an ethereal solution. The resulting methyl ester is refluxed with hydrazine hydrate in ethanol to give the hydrazide which is diazotized with hydrochloric acid and sodium nitrite to give the azide.

The phenylcyclopropylamine intermediates are either known to the art or are prepared by hydrolysis of the corresponding isocyanate prepared as above.

The following examples are not limiting but are illustrative of compounds of this invention and the procedures for their preparation.

Example 1

A solution of 66.5 g. of trans-2-phenylcyclopropylamine in 400 ml. of ethyl formate is heated at reflux for 17 hours. Excess ethyl formate is removed in vacuo to leave, as the residue, trans-N-(2-phenylcyclopropyl)formamide, M.P. 65–66.5° C., after recrystallization from toluene.

Example 2

A mixture of 39.9 g. of trans-2-phenylcyclopropylamine, 12 g. of sodium hydroxide and 50 ml. of water is stirred, cooled to 0° C. and treated with 32.5 g. of ethyl chloroformate which is added slowly keeping the temperature of the reaction mixture below 20° C. The mixture is stirred for 30 minutes at 0° C., then extracted with ether. The extracts are dried, concentrated and distilled to give trans-ethyl N-(2-phenylcyclopropyl)carbamate, B.P. 134–136° C. (0.1 mm.). Melting point after recrystallization from ethyl acetate-petroleum ether is 47.5–49° C.

Example 3

To a stirred solution of 6 g. of sodium hydroxide, 20.0 g. of trans-2-phenylcyclopropylamine and 35 ml. of water is added 25.5 g. of benzyl chloroformate keeping the temperature below 20° C. The resulting mixture is stirred at 0° C. for 30 minutes. Extracting with ether, concentrating and distilling the extracts gives trans-benzyl N-(2-phenylcyclopropyl)carbamate, which is recrystallized from ethyl acetate-petroleum ether to give a product with M.P. 75–76° C.

Example 4

2-phenylcyclopropylamine (13.3 g.) is added slowly to a solution of 13.6 g. of t-butyl chloroformate, 4.0 g. of sodium hydroxide and 25 ml. of water keeping the temperature below 20° C. After stirring at 0° C. for one hour and working up as in Example 3, t-butyl N-(2-phenylcyclopropyl)carbamate is obtained.

Example 5

To a mixture of 17.0 g. of benzyl chloroformate, 4.0 g. of sodium hydroxide and 40 ml. of water is added 14.7 g. of N-methyl-2-phenylcyclopropylamine. The temperature is held below 20° C. during the addition. After stirring for 30 minutes at 0° C. and working up as in Example 3, benzyl N-methyl-N-(2-phenylcyclopropyl)carbamate is obtained.

Example 6

4-trifluoromethylstyrene (30.0 g.) and 35.0 g. of ethyl diazoacetate are mixed at 0° C. and the mixture gradually heated to 150° C. The reaction is maintained at this temperature for three hours and then the mixture is distilled under reduced pressure. The main fraction is collected which consists of ethyl 2-(4-trifluoromethylphenyl)-cyclopropanecarboxylate.

A solution of 11.5 g. of potassium hydroxide in 12 ml. of water and 50 ml. of 95% ethanol is added to 17.6 g. of ethyl 2-(4-trifluoromethylphenyl)cyclopropanecarboxylate. The solution is refluxed for eight hours, then concentrated, acidified with hydrochloric acid and filtered to give after fractional recrystallization the separated isomeric cis- and trans-2-(4-trifluoromethylphenyl)cyclopropanecarboxylic acids.

Trans-2-(4-trifluoromethylphenyl)cyclopropanecarboxylic acid is esterified with an ethereal solution of diazomethane; the methyl ester converted to the acid hydrazide with 100% hydrazine hydrate in ethanol; the hydrazide diazotized and decomposed by heating in a toluene-methanol solution to give methyl N-[2-(4-trifluoromethylphenyl)cyclopropyl]carbamate; and the carbamate hydrolyzed with a saturated methanolic solution of barium hydroxide octahydrate to yield trans-2-(4-trifluoromethylphenyl)-cyclopropylamine.

Benzyl chloroformate (17.0 g.) is added dropwise to a mixture of 4.0 g. of sodium hydroxide, 20.1 g. of trans-2-(4-trifluoromethylphenyl)cyclopropylamine and 50 ml. of water at 15–20° C. The mixture is stirred at 0° C. for 30 minutes then extracted with ether. The extracts are dried, concentrated and distilled to give trans-benzyl N-[2-(4-trifluoromethylphenyl)cyclopropyl]carbamate.

Example 7

4-chlorostyrene (48.5 g.) and 7.0 g. of ethyl diazoacetate are mixed carefully at 0° C. The mixture is gradually heated to 160° C. and the exothermic reaction is maintained at this temperature by alternate heating and cooling as required. After the initial exothermic reaction is completed, the mixture is held at 160° C. for four hours. The mixture is distilled under reduced pressure and the fraction, B.P. 126–165° C. at 1–2 mm., is collected. The above fraction is redistilled through a 12″ Vigreux column to give two fractions, B.P. 121–6° C. at 0.8 mm., which is predominately cis-ethyl 2-(4-chlorophenyl)cyclopropanecarboxylate, and B.P. 136–140° C. at 0.8 mm., which is predominately trans-ethyl 2-(4-chlorophenyl)cyclopropanecarboxylate.

To 7.6 g. of trans-ethyl 2-(4-chlorophenyl)cyclopropanecarboxylate is added a solution of 5.7 g. of potassium hydroxide in 5.7 ml. of water and 25 ml. of 95% ethanol. The resulting solution is refluxed for four hours and then concentrated in vacuo. The residue is dissolved in 40 ml. of water and the solution adjusted to pH 1 with 10% hydrochloric acid solution. The crystalline precipitate is recrystallized from boiling water to give colorless needles, M.P. 114–116° C., of trans-2-(4-chlorophenyl)cyclopropanecarboxylic acid.

A mixture of 54.0 g. of trans-2-(4-chlorophenyl)cyclopropanecarboxylic acid and 75 ml. of thionyl chloride is allowed to stand at room temperature for 20 hours. Excess thionyl chloride is removed in vacuo, the last traces being stripped with benzene. The residue is distilled under reduced pressure to give a colorless oil, B.P. 131–133° C. at 1.4 mm., trans-2-(4-chlorophenyl)cyclopropanecarbonyl chloride.

Technical sodium azide (22.5 g.) is covered with 75 ml. of dry toluene and the mixture is heated gradually while a solution of 18.0 g. of trans-2-(4-chlorophenyl)-cyclopropanecarbonyl chloride in 75 ml. of dry toluene is added slowly over a period of 15 minutes. The mixture is refluxed for three hours, cooled, and the precipitated salts are filtered. The filtrate is evaporated in vacuo to lease the isocyanate as a red oil. The isocyanate (15.0 g.) is heated with 50 ml. of benzyl alcohol at 95–100° C. for two hours to give, after removal of the excess alcohol and recrystallization of the residue from ethyl acetate-petroleum ether, trans-benzyl N-[2-(4-chlorophenyl)cyclopropyl]carbamate.

Example 8

A mixture of 5.0 g. of 2-(2,5-dichlorophenyl)cyclopropylisocyanate, prepared as in Example 7 from 2-5-dichlorostyrene, and 30 ml. of benzyl alcohol is heated at about 100° C. for two hours to give, after evaporation of the excess alcohol in vacuo and recrystallization of the residue from ethyl acetate-petroleum ether, benzyl N-[2-(2,5-dichlorophenyl)cyclopropyl]carbamate.

Example 9

A mixture of 10.0 g. of 2-(4-fluorophenyl)cyclopropylisocyanate (prepared by substituting 4-fluorostyrene for 4-chlorostyrene in the process of Example 7) and 40 ml. of phenethyl alcohol is heated at 90–95° C. for two hours. Evaporation of the excess alcohol leaves phenethyl N-[2-(4-fluorophenyl)cyclopropyl]carbamate.

Example 10

A mixture of 7.5 g. of 2-(2-methoxyphenyl)cyclopropylisocyanate, prepared as in Example 7 from 2-methoxystyrene, and 50 ml. of phenethyl alcohol is heated at 100° C. for one hour to give phenethyl N-[2-(2-methoxyphenyl)cyclopropyl]carbamate.

Example 11

To a mixture of 7.3 g. of 2-(3-tolyl)cyclopropylamine (prepared as in Example 6 from 3-methylstyrene), 2.0 g. of sodium hydroxide and 25 ml. of water is added dropwise 8.5 g. of benzyl chloroformate keeping the temperature below 20° C. Stirring at 0° C. for 30 minutes and working up the reaction mixture yields benzyl N-[2-(3-tolyl)cyclopropyl]carbamate.

Example 12

A mixture of 16.1 g. of 2-(2,4-xylyl)cyclopropylamine (prepared as in Example 6 from 2,4-dimethylstyrene), 13.7 g. of n-butyl bromide, 4.2 g. of sodium amide and 50 ml. of toluene is heated at reflux for six hours. After addition of water to the reaction mixture, the organic layer is separated and extracted with dilute hydrochloric acid. The acid extracts are neutralized and extracted with benzene. Removing the benzene in vacuo gives N-butyl-2-(2,4-xylyl)cyclopropylamine.

To a stirred mixture of 10.6 g. of N-butyl-2-(2,4-xylyl)cyclopropylamine, 2.0 g. of sodium hydroxide and 35 ml. of water is added 8.5 g. of benzyl chloroformate. The reaction mixture is kept below 20° C. during the chloroformate addition, after which it is stirred at 0° C. for 30 minutes. Working up as in Example 1 yields benzyl N-butyl-N-[2-(2,4-xylyl)cyclopropyl]carbamate.

Example 13

A mixture of 18.9 g. of 2-(4-butylphenyl)cyclopropylamine (prepared as in Example 6 from 4-butylstyrene), 11.0 g. of ethyl bromide, 4.2 g. of sodium amide and 100 ml. of xylene is refluxed for five hours. Working up as in Example 12 gives N-ethyl-2-(4-butylphenyl)cyclopropylamine.

To a mixture of 10.8 g. of N-ethyl-2-(4-butylphenyl)cyclopropylamine, 2.0 g. of sodium hydroxide and 35 ml. of water is added dropwise 6.1 g. of n-propyl chloroformate at 15–20° C. After stirring the reaction mixture at 0° C. for 30 minutes and working up as in Example 1, n-propyl N-ethyl-N-[2-(4-butylphenyl)cyclopropyl]carbamate.

Example 14

Benzyl alcohol (50 ml.) and 2-(3,4-dichlorophenyl)cyclopropylisocyanate (8.2 g.), prepared as in Example 7 from 3,4-dichlorostyrene, is heated at about 100° C. for 1.5 hours. Removing the excess alcohol in vacuo leaves benzyl N-[2-(3,4-dichlorophenyl)cyclopropyl]carbamate.

Example 15

Phenethyl chloroformate, 18.4 g. (prepared by adding phenethyl alcohol to a toluene solution of phosgene, allowing the mixture to stand in an ice bath for 30 minutes, then at room temperature for two hours and concentrating in vacuo), is added slowly to a mixture of 13.3 g. of cis-2-phenylcyclopropylamine, 4.0 g. of sodium hydroxide and 50 ml. of water. During the addition the temperature is held below 20° C. The resulting mixture is stirred at 0° C. for 30 minutes and worked up as described in Example 1 to give cis-phenethyl N-(2-phenylcyclopropyl)carbamate.

Example 16

A solution of 56.8 g. of trans-2-phenylcyclopropanecarboxylic acid in 100 ml. of water and 250 ml. of acetone is cooled to 0° C. and 50.6 g. of triethylamine in 1 l. of acetone is added. While the temperature is maintained at 0° C. a solution of 54.3 g. of ethyl chloroformate in 250 ml. of acetone is slowly added. The solution is stirred for 30 minutes at 0° C. and then a solution of 52.0 g. of sodium azide in 150 ml. of water is added dropwise. The stirring is continued for one hour and then the mixture is poured into an excess of ice water. The oil which separates is extracted with ether and the combined, dried extract is evaporated in vacuo to leave the oily azide which is dissolved in 500 ml. of toluene. The toluene solution is heated on a steam bath until the evolution of nitrogen is complete and is then evaporated in vacuo to leave the isocyanate. The isocyanate is heated at 100° C. for one hour with excess benzyl alcohol to give trans-benzyl N-(2-phenylcyclopropyl)carbamate.

What is claimed is:

1. A chemical compound having the formula:

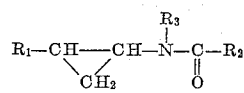

in which $R_1$ is a member selected from the group consisting of phenyl, chlorophenyl, fluorophenyl, trifluoromethylphenyl, lower alkylphenyl, dichlorophenyl and dilower alkylphenyl; $R_2$ is a member selected from the group consisting of lower alkoxy, benzyloxy and phenethoxy; and $R_3$ is selected from the group consisting of hydrogen and lower alkyl.

2. A chemical compound having the formula:

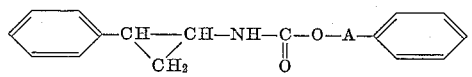

in which A in an alkylene group having 1–2 carbon atoms.

3. Benzyl N-(2-phenylcyclopropyl)carbamate.
4. Trans-benzyl N-(2-phenylcyclopropyl)carbamate.
5. Benzyl N-[2-(3,4-dichlorophenyl)cyclopropyl]carbamate.

References Cited in the file of this patent

UNITED STATES PATENTS 2,934,542    Berger                Apr. 26, 1960
2,969,373    Loev et al.            Jan. 24, 1961

OTHER REFERENCES

Burger et al.: J. Am. Chem. Soc., vol. 70, pp. 2198 to 2201 (1948).